Feb. 16, 1943.  R. H. ADDIS  2,311,323
RIVET GAUGE
Filed Jan. 17, 1942
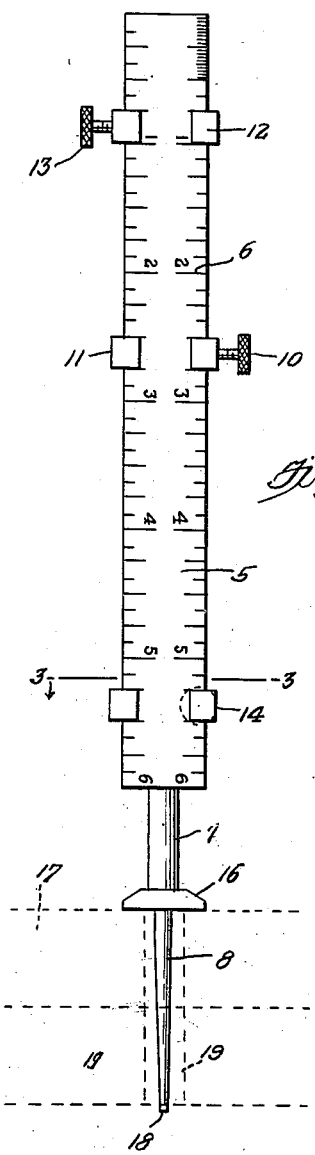
Fig. 1.
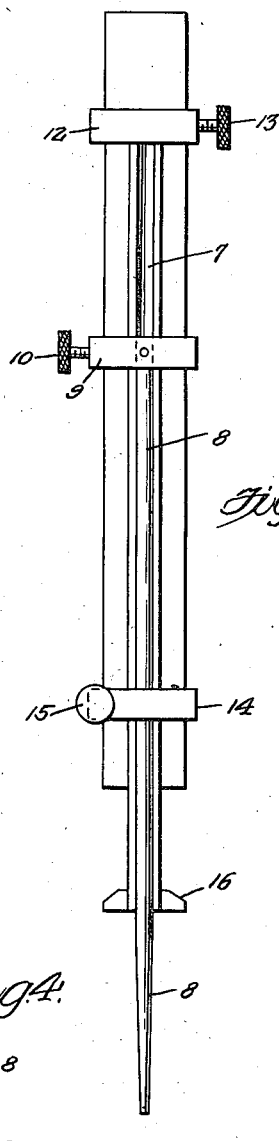
Fig. 2.
Fig. 4.
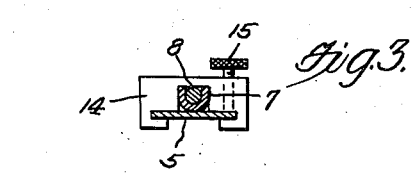
Fig. 3.
Inventor
Rexford H. Addis
By Clarence A. O'Brien
and Harvey B. Jacobson
Attorneys Patented Feb. 16, 1943

2,311,323

UNITED STATES PATENT OFFICE 2,311,323

RIVET GAUGE

Rexford H. Addis, Dearborn, Mich.

Application January 17, 1942, Serial No. 427,185

4 Claims. (Cl. 33—143)

The present invention relates to new and useful improvements in gauges for determining the length of rivets, bolts, and the like most suitable for use in holes of varying lengths in material through which the rivet is to be inserted and the invention has for its primary object to provide an adjustable gauge of this character of simple and practical construction, which is efficient and reliable in performance, relatively inexpensive to manufacture, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout and in which:

Figure 1 is a front elevational view.

Figure 2 is a rear elevational view.

Figure 3 is a transverse sectional view taken substantially on a line 3—3 of Figure 1, and Figure 4 is an end view of the gauge rod showing the hook for engaging the work at one end of the opening.

Referring now to the drawing in detail, wherein for the purpose of illustration I have disclosed a preferred embodiment of the invention, the numeral 5 designates a flat substantially rectangular plate having the graduations 6 marked along one surface at each longitudinal edge thereof and preferably graduated into inches and fractions thereof.

Suitably secured to the rear face of the plate 5 is a gauge rod guide 7 of channel shape in cross-section and in which the gauge rod 8 is slidably mounted. Secured to the inner end of the gauge rod is a clamp 9, the clamp comprising a transverse bar extending across the rear of the plate 5 and having its ends extending inwardly at the opposite side edges of the plate across the front thereof to slidably mount the clamp on the plate, the clamp being secured in position to the plate by a set screw 10.

The inturned ends 11 of the clamp serve as indicators with respect to the graduations 6 on the face of the gauge plate.

An upper clamp 12 of similar construction is secured to the guide 7 and is also secured to the plate by a set screw 13.

A lower clamp 14 is secured to the plate 5 by means of a set screw 15 and slidably receives both the guide 7 and gauge rod 8.

On the lower end of the guide 7 is a foot 16 adapted to engage one surface of the work designated by the dotted line 17, while the lower end of the gauge rod 8 is formed with a hook 18 adapted to engage the opposite surface of the work when the gauge rod is inserted in an opening 19 extending through the work.

Accordingly, the gauge rod 8 may be utilized to determine the thickness of the work, the inturned ends 11 of the clamp 9 and the inturned ends of the clamp 12 cooperating to measure the length of the opening in accordance with the distance between the two clamps as indicated on the scale.

In order to allow for the forming of the desired head on the rivet, the clamp 12 is moved downwardly on the plate 5 the necessary distance as indicated on the scale and the total length of the rivet required plus the head to be formed thereon will be indicated by the reading of the lower clamp 9.

It is believed the details of construction, advantages and manner of use of the device will be readily understood from the foregoing without further detailed explanation.

Having thus described the invention what I claim is:

1. A gauge of the class described comprising a plate having graduations on one surface thereof, a guide slidably carried by the plate means for securing the guide against movement relative to the plate, a gauge rod slidably carried by the guide, and means for securing the gauge rod in adjusted position relative to the guide, said securing means for the guide and the gauge rod having indicators carried thereby and associated with the graduations of the plate to measure the distance of adjustment of the gauge rod.

2. A rivet gauge comprising a plate having graduations thereon, a channeled guide, means for adjustably securing the guide to the plate, a gauge rod slidably mounted in the channel of the guide, means for securing the rod in adjusted position in the guide, and lateral extensions on the guide and on the rod engageable with opposite edges of work through which the rod is inserted, said securing means for the guide and rod cooperating with the graduations on the plate to indicate a measurement of the work.

3. A rivet gauge comprising a plate having graduations thereon, a channeled guide, means for adjustably securing the guide to the plate, a gauge rod slidably mounted in the channel of the guide, means for securing the rod in adjusted position in the guide, and lateral extensions on the guide and on the rod engageable with opposite edges of work through which the rod is inserted, and indicators carried by the securing means for the guide and rod cooperating with the graduations on the plate to indicate a measurement of the work.

4. A rivet gauge comprising a plate having graduations thereon, a channeled guide, a gauge rod slidably mounted in the channel of the guide, and combined clamping elements and indicators carried by the channel guide and the gauge rod and adjustably secured to said plate with portions of the combined clamping elements and indicators cooperating with the graduations on the plate to indicate measurement of the work.

REXFORD H. ADDIS.